(12) United States Patent
Kaiga et al.

(10) Patent No.: US 11,079,701 B2
(45) Date of Patent: Aug. 3, 2021

(54) IMAGE FORMING APPARATUS

(71) Applicant: CANON KABUSHIKI KAISHA, Tokyo (JP)

(72) Inventors: Miho Kaiga, Shizuoka (JP); Yohei Suzuki, Shizuoka (JP); Junichi Ochi, Shizuoka (JP); Atsushi Kawarago, Shizuoka (JP); Toshifumi Kitamura, Shizuoka (JP); Kenichi Fujii, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/061,076

(22) Filed: Oct. 1, 2020

(65) Prior Publication Data

US 2021/0109464 A1 Apr. 15, 2021

(30) Foreign Application Priority Data

Oct. 10, 2019 (JP) .............................. JP2019-187036

(51) Int. Cl.
   *G03G 15/16* (2006.01)
   *G03G 15/00* (2006.01)
   *H04N 1/00* (2006.01)

(52) U.S. Cl.
   CPC ..... *G03G 15/1605* (2013.01); *G03G 15/6555* (2013.01); *H04N 1/00572* (2013.01); *G03G 2215/0043* (2013.01); *G03G 2215/00409* (2013.01); *G03G 2215/1638* (2013.01)

(58) Field of Classification Search
   CPC ........... G03G 15/1605; G03G 15/6555; G03G 15/00409; G03G 15/0043; G03G 15/1638; G03G 15/5062
   See application file for complete search history.

(56) References Cited

U.S. PATENT DOCUMENTS

| 8,934,805 B2 * | 1/2015 | Ishida | ................ G03G 21/1652 |
| | | | 399/90 |
| 2013/0293909 A1 * | 11/2013 | Endo | ................... H04N 1/00572 |
| | | | 358/1.12 |

FOREIGN PATENT DOCUMENTS

| JP | 2001183881 A | 7/2001 |
| JP | 2011237733 A | 11/2011 |
| JP | 2017146487 A | 8/2017 |

* cited by examiner

*Primary Examiner* — Walter L Lindsay, Jr.
*Assistant Examiner* — Andrew V Do
(74) *Attorney, Agent, or Firm* — Canon U.S.A., Inc. I.P. Division (57) ABSTRACT

A transfer unit includes a reading unit to read an image on a sheet conveyed along a conveyance path, a first signal transmission member having a flat shape and is connected to the reading unit, and a relay member connected to the first signal transmission member. The relay member relays a signal from the first signal transmission member, and a second signal transmission member having a round shape and is connected to the relay member. The second signal transmission member leads into an apparatus body from an inner portion of the transfer unit in an axial direction of a first rotation shaft.

14 Claims, 8 Drawing Sheets

IMAGE FORMING APPARATUS

BACKGROUND

Field

The present disclosure relates to an image forming apparatus having a reading unit to read an image fixed on a sheet conveyed along a conveyance path.

Description of the Related Art

Japanese Patent Application Laid-Open No. 2017-146487 discusses an image forming apparatus that forms an image on a sheet and reads the image formed on the sheet while conveying the sheet. In Japanese Patent Application Laid-Open No. 2017-146487, a sensor as a reading unit is disposed in a conveyance path through which a sheet passes when images are formed on both sides of the sheet.

Although Japanese Patent Application Laid-Open No. 2017-146487 discusses a configuration in which the sensor is fixed to an image forming apparatus, a configuration in which a unit rotatable with respect to the image forming apparatus holds the sensor as the reading unit is not discussed.

SUMMARY

The present disclosure is directed to an image forming apparatus that reduces influence on detection accuracy of a reading unit regardless of rotation of a rotation unit that holds the reading unit.

According to an aspect of the present disclosure, an image forming apparatus includes an apparatus body having an image forming unit including an intermediate transfer belt and configured to form a toner image and to cause the intermediate transfer belt to bear the formed toner image, a transfer unit including a transfer member configured to secondarily transfer the toner image from the intermediate transfer belt to a sheet, wherein the transfer unit is configured to be rotatable about a first rotation shaft with respect to the apparatus body, a fixing unit configured to fix the toner image secondarily transferred to the sheet as an image on the sheet, and a duplex conveyance unit configured to convey the sheet having passed through the fixing unit toward the image forming unit again, wherein the transfer unit includes a reading unit configured to read the image fixed on the sheet conveyed along a conveyance path in the duplex conveyance unit, a first signal transmission member that has a flat shape and that is connected to the reading unit, a relay member connected to the first signal transmission member and configured to relay a signal from the first signal transmission member, and a second signal transmission member having a round shape, wherein the second signal transmission member is connected to the relay member, and wherein the second signal transmission member leads into the apparatus body from an inner portion of the transfer unit in an axial direction of the first rotation shaft.

Further features of the present disclosure will become apparent from the following description of exemplary embodiments with reference to the attached drawings.

DESCRIPTION OF THE EMBODIMENTS

Exemplary embodiments will be hereinafter described in detail with reference to the drawings. The exemplary embodiments are not intended to limit the scope of the claims of the present disclosure. Although a plurality of features is described in the following exemplary embodiments, not all of the features are necessary for the present disclosure and the features can be optionally combined. In the drawings, similar or the same configurations are given the same reference numerals, and redundant descriptions thereof are omitted.

Figure 1:
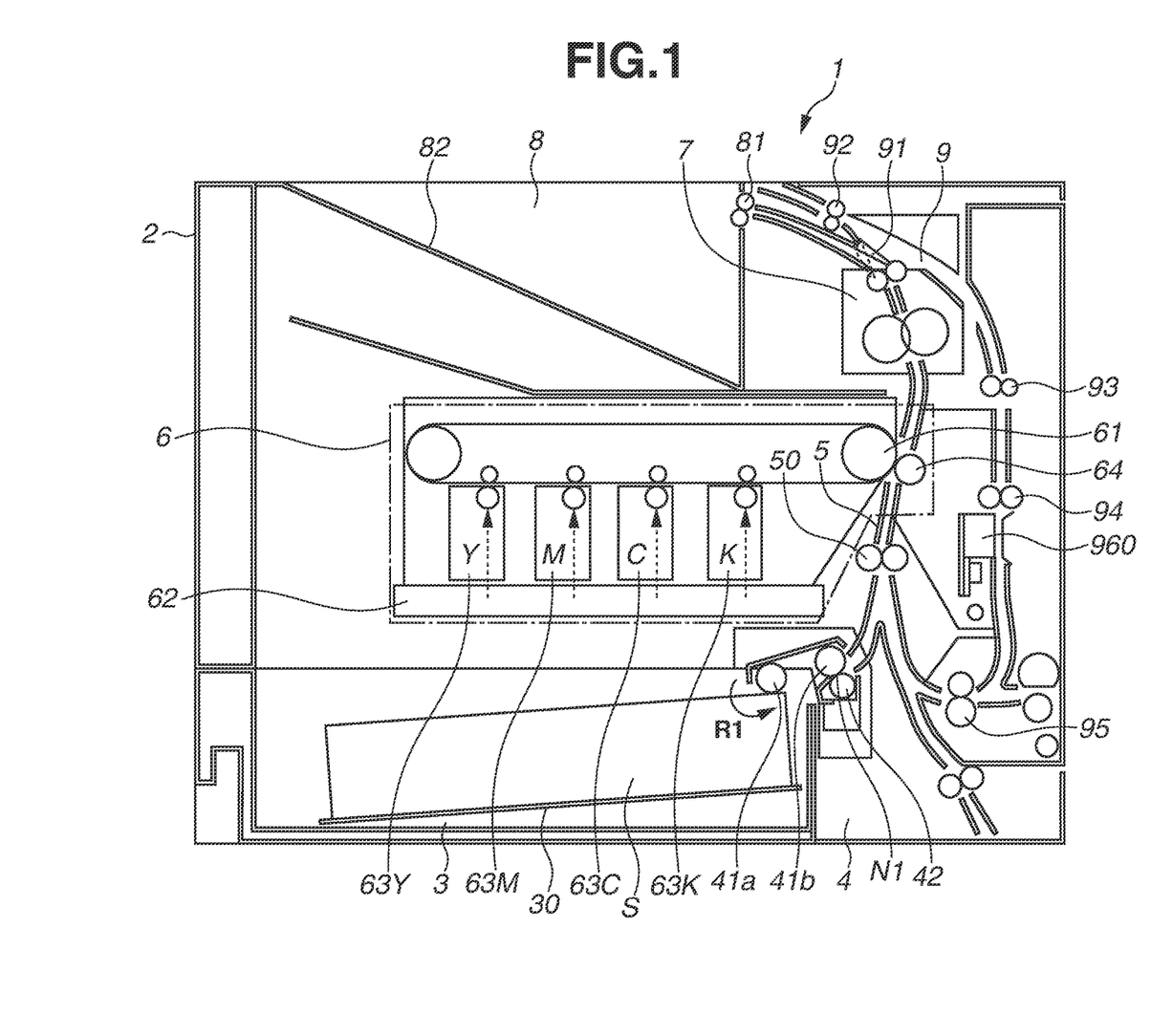
FIG. 1 is an overall diagram schematically illustrating an image forming apparatus according to a first exemplary embodiment.

FIG. 1 is a sectional view schematically illustrating an image forming apparatus 1 according to a first exemplary embodiment. Herein, an electrophotographic method is employed as an image forming method. However, an inkjet method may be employed. Moreover, the present exemplary embodiment can be applied to not only a full color printer but also a monochrome printer.

As illustrated in FIG. 1, the image forming apparatus 1 forms an image by using the electrophotographic method. The image forming apparatus 1 at least includes an apparatus body 2 (hereinafter referred to as a body 2), a storage cassette 3 as a storage unit, a feed unit 4, an image forming unit 6, a fixing unit 7, a sheet discharge unit 8, and a conveyance unit 9. Each of the units is attached to the body 2 and included in the body 2.

The storage cassette 3 includes a stacking plate 30 as a stacking member on which sheets S are stacked, and the stacking plate 30 is vertically movable with the sheets S stacked thereon. The feed unit 4 includes a feed roller 41a as a feed member that feeds a sheet S, a conveyance roller 41b as a conveyance member, and a separation roller 42 that forms a separation nip N1 with the conveyance roller 41b. The stacking plate 30 can move up to a position at which the top surface of stacked sheets S contacts the feed roller 41a. If the top surface of the stacked sheets S contacts the feed roller 41a, the sheets S are fed by the feed roller 41a rotating in a direction indicted by an arrow R1 illustrated in FIG. 1 into the separation nip N1 formed by the conveyance roller 41b and the separation roller 42. After one sheet S is separated from the other sheets S in the separation nip N1, the separated sheet S is conveyed toward a transfer nip portion.

The image forming unit 6 at least includes an intermediate transfer belt 61 as an intermediate transfer member, an exposure unit 62, and image forming cartridges 63Y, 63M, 63C, and 63K. The image forming cartridges 63Y, 63M, 63C, and 63K form respective toner images of yellow (Y), magenta (M), cyan (C), and black (K) by using an electrophotographic method, and the toner images are primarily transferred to the intermediate transfer belt 61. The intermediate transfer belt 61 contacts a secondary transfer roller 64 to form the transfer nip portion. The toner images primarily transferred to the intermediate transfer belt 61 are secondarily transferred to the sheet S at the transfer nip portion. The sheet S is conveyed to the transfer nip portion by an intermediate conveyance roller 50 in an intermediate conveyance unit 5 in synchronization with a timing of the arrival of the toner image at the transfer nip portion.

The fixing unit 7 heats and presses the toner image to fix it on the sheet S. The sheet S on which the toner image has been fixed is discharged onto a sheet discharge tray 82 by a discharge roller 81. The sheet discharge unit 8 includes the discharge roller 81 and the sheet discharge tray 82.

If images are formed on both sides of the sheet S, the sheet S on which the toner image has been fixed by the fixing unit 7 is guided to the conveyance unit 9. The conveyance unit 9 at least includes a reverse roller 92, a switching flapper 91, a duplex conveyance roller pair 93, a duplex conveyance intermediate roller pair 94, and a duplex re-feed roller pair 95. First, the switching flapper 91 is shifted by an actuator (not illustrated) to the position indicated by the dotted line illustrated in FIG. 1. The sheet S passes over the upper surface of the switching flapper 91, and the reverse roller 92 conveys the sheet S. When the trailing edge of the sheet S reaches the upper surface of the switching flapper 91, the switching flapper 91 is shifted by the actuator (not illustrated) to the position indicated by the solid line illustrated in FIG. 1. Subsequently, the reverse roller 92 is reversed, so that the sheet S is conveyed to the duplex conveyance roller pair 93.

The sheet S is conveyed by the duplex conveyance roller pair 93 and the duplex conveyance intermediate roller pair 94, and the image fixed on the sheet S is read by a contact image sensor (CIS) unit 960 as a reading unit in the course of conveyance of the sheet S along a conveyance path in the conveyance unit 9. A central processing unit (CPU) as a control unit determines a print state of the image or execute a failure diagnosis on the image forming apparatus 1, based on a result of the reading of the sheet S by a CIS 96 included in the CIS unit 960. Subsequently, the sheet S is conveyed by the duplex re-feed roller pair 95 and the intermediate conveyance roller 50, and a print operation is performed anew on the other surface of the sheet S.

Figure 2:
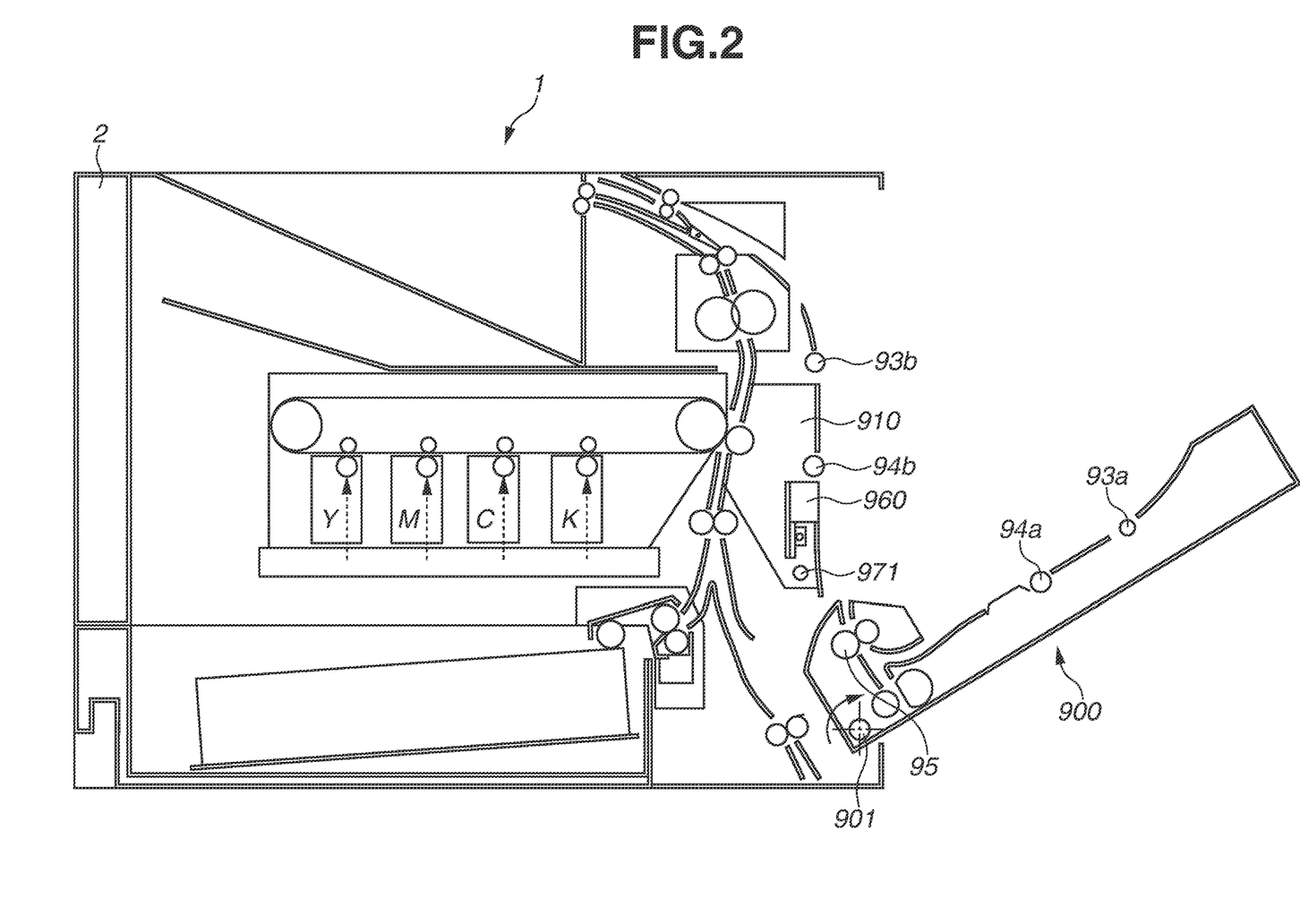
FIG. 2 is a sectional view illustrating a rotated duplex conveyance unit.

FIG. 2 illustrates the opened conveyance unit 9 of the image forming apparatus 1. The conveyance unit 9 includes a duplex conveyance unit 900 in which a duplex conveyance drive roller 93a, a duplex drive roller 94a, and the duplex re-feed roller pair 95 are combined into a unit. The duplex conveyance unit 900 has the function of conveying the sheet S having passed through the fixing unit 7 toward the image forming unit 6 again.

The duplex conveyance unit 900 is rotatable with respect to the body 2 of the image forming apparatus 1 about a duplex unit spindle 901. If a glass surface of the CIS 96 is to be cleaned or if an action is to be taken for a sheet jam or an operational failure that occurs in the conveyance unit 9 or the feed unit 4, the duplex conveyance unit 900 is rotated about the duplex unit spindle 901. After the duplex conveyance unit 900 is rotated, a user accesses an inner portion of the conveyance unit 9 and takes various actions.

Figure 3:
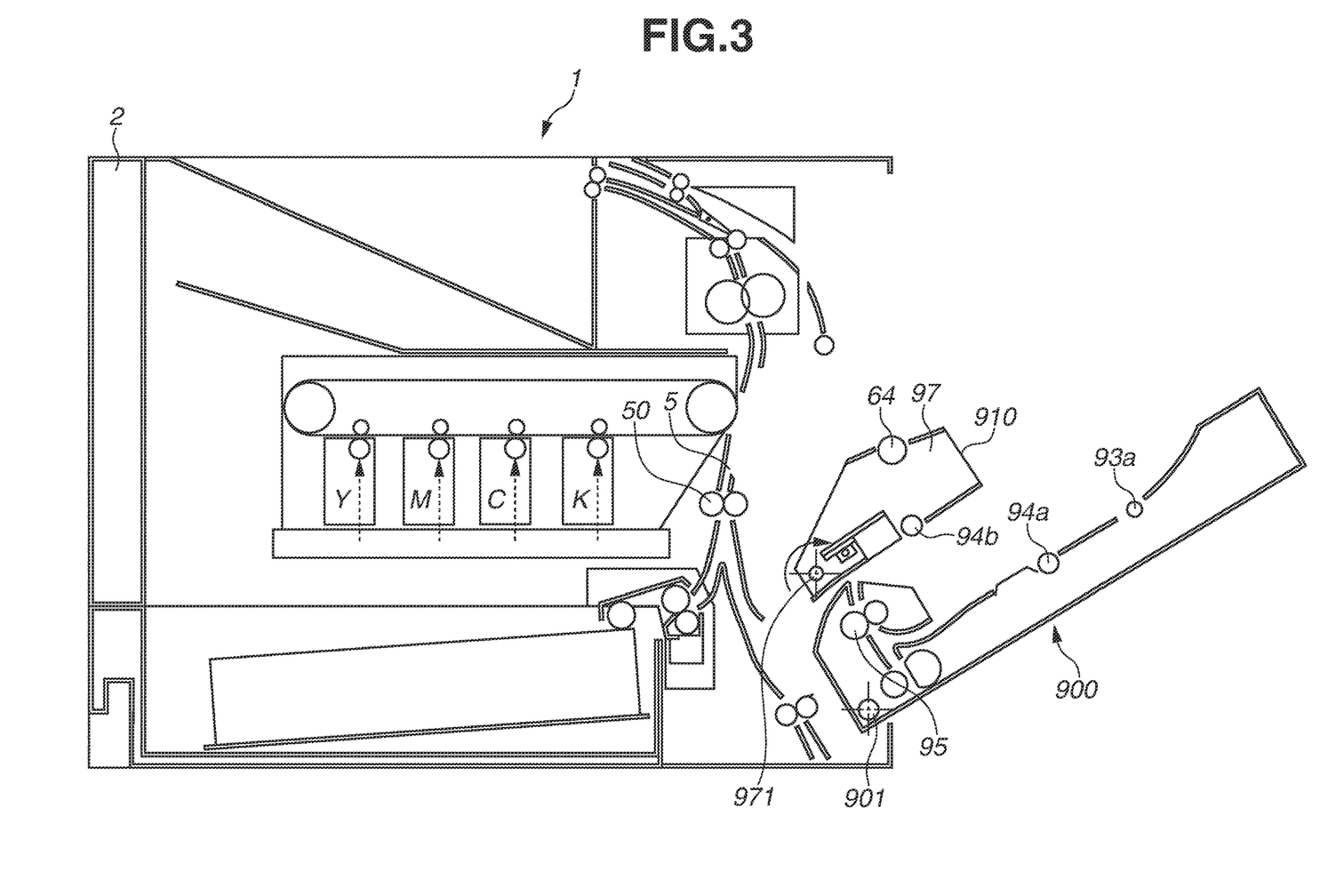
FIG. 3 is a sectional view illustrating the rotated duplex conveyance unit and a rotated transfer unit.

FIG. 3 illustrates the opened conveyance unit 9 and the opened intermediate conveyance unit 5 of the image forming apparatus 1. To remove a sheet S positioned in the conveyance path in the conveyance unit 9, the mere opening of the conveyance unit 9 is enough. However, to remove a sheet S out of the transfer nip portion, the intermediate conveyance unit 5 is to be opened. Accordingly, the transfer unit 910 including a part of the intermediate conveyance unit 5 and the transfer roller 64 is configured as a rotation unit rotatable about a first rotation shaft. Specifically, the transfer unit 910 includes a transfer frame spindle 971 as a first rotation shaft. The transfer frame spindle 971 is a support shaft protruding from the inside to the outside of the transfer unit 910.

As illustrated in FIG. 3, the rotation of the transfer unit 910 about the transfer frame spindle 971 opens the transfer nip portion.

The transfer unit 910 at least includes the transfer roller 64 as a transfer member. In the present exemplary embodiment, the transfer unit 910 includes a duplex driven roller 94b and the CIS unit 960 as the reading unit. The transfer roller 64, the duplex driven roller 94b, and the CIS unit 960 each are supported by a transfer frame 97 as a support member.

The duplex driven roller 94b is a driven conveyance member that is driven by the duplex drive roller 94a of the conveyance unit 9.

If an action is to be taken for a sheet jam or an operational failure that occurs in the intermediate conveyance unit 5 or the feed unit 4, the transfer unit 910 is rotated about the transfer frame spindle 971. Thus, a user accesses an inner portion of the intermediate conveyance unit 5 and takes various actions.

Figure 4:
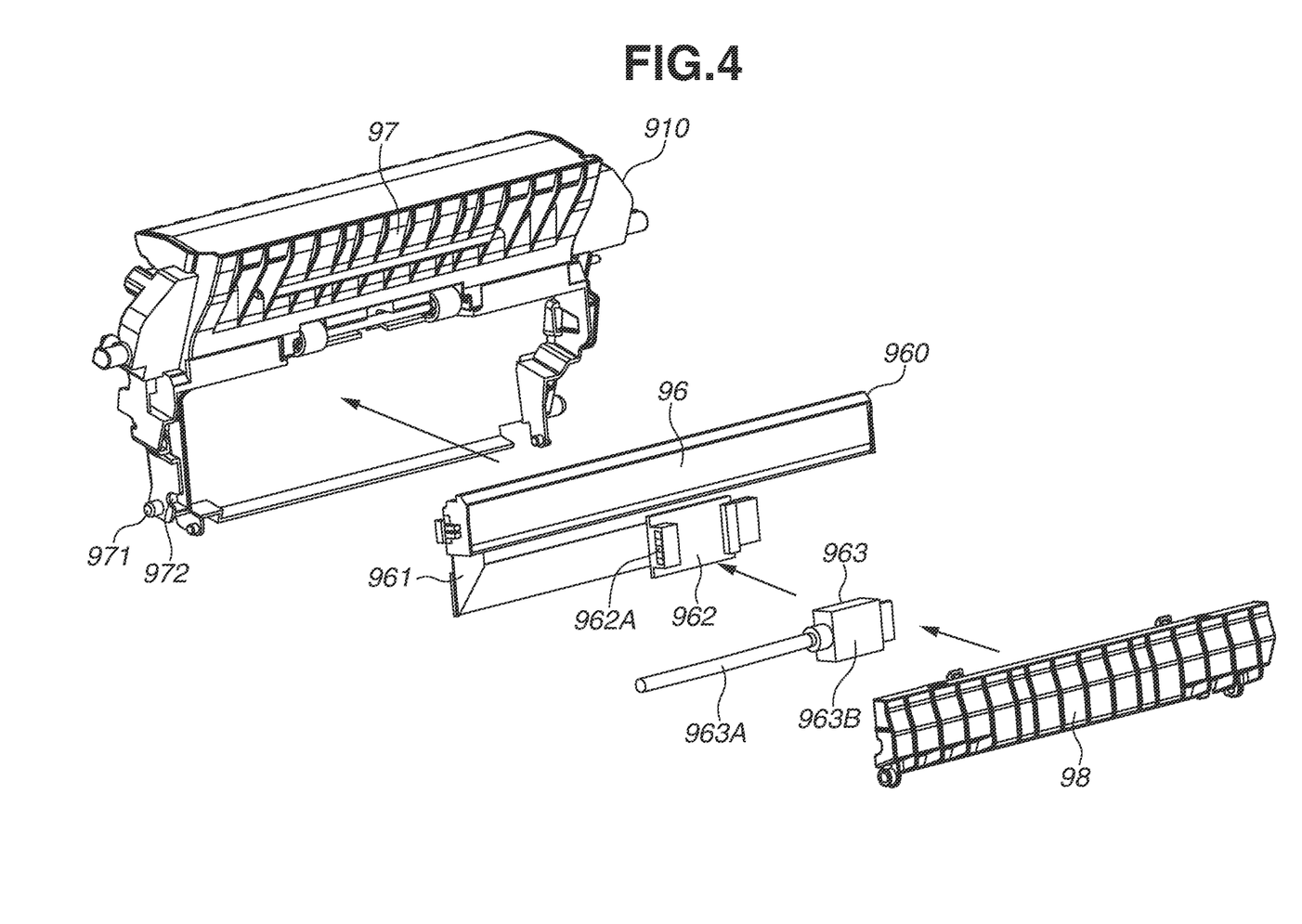
FIG. 4 is an exploded perspective view illustrating the transfer unit.

FIG. 4 is a perspective view illustrating an internal configuration, related to the CIS 96, of the transfer unit 910 of FIG. 3. The CIS unit 960 includes the CIS 96 as a sensor member and a flexible flat cable (FFC) 961 as a first signal transmission member that electrically communicates with the CIS 96 and a control unit included in the image forming apparatus 1. The FFC 961 is a flat-shaped signal transmission cable. The FFC 961 is an electric wire bundle packing a plurality of coated electric wires in a flat shape, and is bendable in a planar direction. The FFC 961 deformed in a direction other than a planar direction in the course of the rotation of the transfer unit 910 may result in a broken wire of the FFC 961 due to twisting or bending of the FFC 961.

To prevent such a case, in the present exemplary embodiment, the CIS unit 960 of the transfer unit 910 further includes a relay board 962 as a relay member to be connected to the FFC 961. The relay board 962 includes a connector portion 962A as a first connection portion. The relay board 962 is an electric board that converts an electric signal transmitted from the FFC 961 to relay the converted signal. In the present exemplary embodiment, a second signal transmission member 963 is connected to the relay board 962. The second signal transmission member 963 includes a round-shaped (a round core) High-Definition Multimedia Interface (HDMI) cable standardized by HDMI® Forum. That is, the second signal transmission member 963 includes an electric wire bundle packing a plurality of electric wires in a round shape. Hereinafter, the second signal transmission member 963 is referred to as an HDMI cable 963.

The HDMI cable 963 includes a cable portion 963A and a connector portion 963B to be connected to the connector portion 962A on the relay board 962. The HDMI cable 963 and the FFC 961 are coupled via the relay board 962. Since the HDMI cable 963 is compatible with many signal wires, the HDMI cable 963 is suitable for electric connection of a CIS. In addition, the HDMI cable 963 provides a high shield effect and little data degradation through data transmission. As a result, the HDMI cable 963 has a benefit and an advantage in noise with the HDMI cable 963 routed inside the body 2.

In the transfer unit 910, the relay board 962 and the HDMI cable 963 are connected after the CIS unit 960 is attached to the transfer frame 97 including a conveyance guide. One portion of the cable portion 963A is inserted into a transfer frame groove 972 as a groove portion near the transfer frame spindle 971. In the present exemplary embodiment, the transfer frame groove 972 and the cable portion 963A are disposed such that clearance is provided therebetween. However, the present exemplary embodiment is not limited thereto. The cable portion 963A may be fitted into and fixed to the transfer frame groove 972. A cover 98 is a housing member that covers the relay board 962 and the cable portion 963A to function as an insulating member and that forms a duplex conveyance path opposite to the side where the transfer roller 64 is held, to function as a part of a series of guides.

Figure 5:
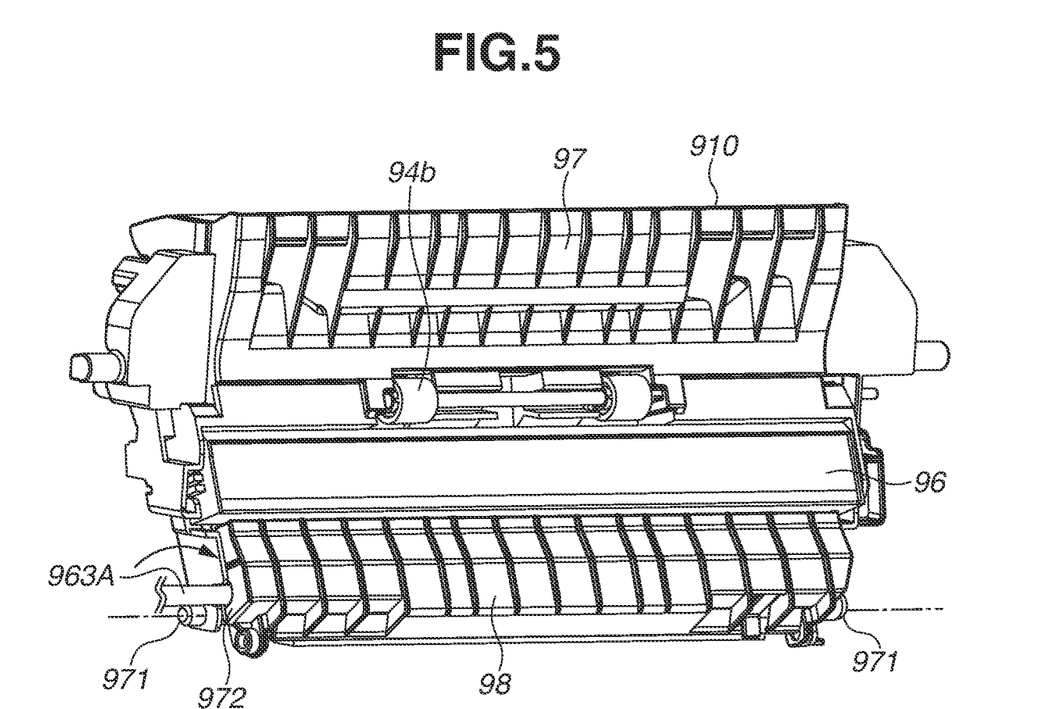
FIG. 5 is a perspective view illustrating the transfer unit.

FIG. 5 is a perspective view illustrating the aforementioned components of the transfer unit 910 fitted in the transfer frame 97. The transfer frame 97, the duplex driven roller 94b, the CIS 96, and the cover 98 form a conveyance surface. The cable portion 963A leads outwardly from the transfer unit 910 via the transfer frame groove 972, coaxially with the transfer frame spindle 971 (the first rotation shaft), and the cable portion 963A is connected to a control unit of the body 2. That is, the HDMI cable 963 leads into the interior of the body 2 from the interior of the transfer unit 910 in the axial direction of the transfer frame spindle 971. Moreover, as illustrated in FIG. 5, the HDMI cable 963 is near the transfer frame spindle 971 in the sight of the axial direction of the transfer frame 97.

Figure 6:
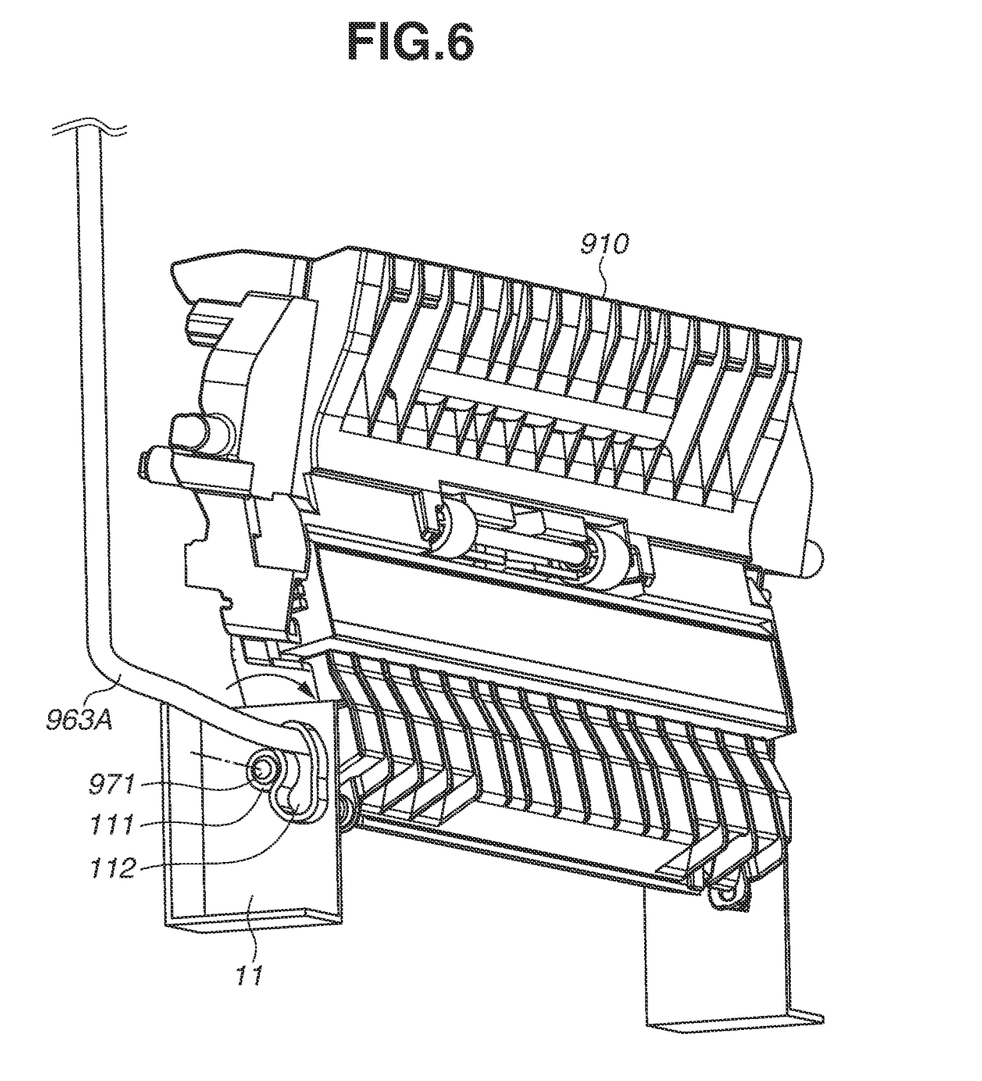
FIG. 6 is a perspective view illustrating the transfer unit attached to a support member.

FIG. 6 illustrates the transfer unit 910 attached to a body frame member 11 as a support member. The transfer frame spindle 971 is supported by a bearing 111 in the body frame member 11. A long hole 112 is arranged on an outer circumferential portion of the bearing 111, and the cable portion 963A leading outwardly from the transfer frame 97 runs through the long hole 112. The long hole 112 is sized large enough for the cable portion 963A to move without stress as the cable portion 963A is moved with the rotation of the transfer unit 910. The transfer unit 910 is rotated about the transfer frame spindle 971 for jam handling. For the operation, the coaxial disposition of the cable 963A near the transfer frame spindle 971 abates a twist force generated by the rotation and prevents an electric signal wire from being broken.

In the present exemplary embodiment, the cable portion 963A is fitted into the transfer frame groove 972. Alternatively, if the transfer frame spindle 971 can have a larger outer diameter, a cable may run through the interior of the transfer frame spindle 971.

In the present exemplary embodiment, the long hole 112 is a closed loop. However, the long hole 112 may be a groove as long as the cable 963 can move without stress and such movement can be restricted at a predetermined position.

The present exemplary embodiment has been described using an example of a flexible flat cable as a first signal transmission member. Alternatively, a flexible printed circuit (FPC) may be used according to the intended or predetermined use based on convenience of high-speed signal exchange or electrical component arrangement flexibility.

The present exemplary embodiment has been described using an example of an HDMI cable as a second signal transmission member. However, the HDMI cable can be changed depending on the conditions such as the number of signal wires, a transfer speed, the presence or absence of a shield, a connector type, and a connector size. For example, a general-purpose low-cost universal serial bus (USB) cable or other various cables may be selected.

In the present exemplary embodiment, the CIS unit 960 is disposed in the transfer unit 910. Such a configuration can prevent the reading surface of the CIS 96 from becoming dirty by a user unexpectedly touching the reading surface of the CIS 96 due to rotation of the CIS unit 960 as the transfer unit 910 is rotated. Since the CIS 96 faces toward or in the direction of gravity when the transfer unit 910 is rotated, paper dust adhering to the reading surface of the CIS 96 can fall from the reading surface.

Next, a second exemplary embodiment will be described. In the first exemplary embodiment, the transfer unit 910 is described as a rotatable unit including a reading unit. In the present exemplary embodiment, an example of a reverse unit used as a rotation unit will be described with reference to FIGS. 7 and 8. The components similar to those in the first exemplary embodiment are given the same reference numerals and the descriptions thereof are omitted.

Figure 7:
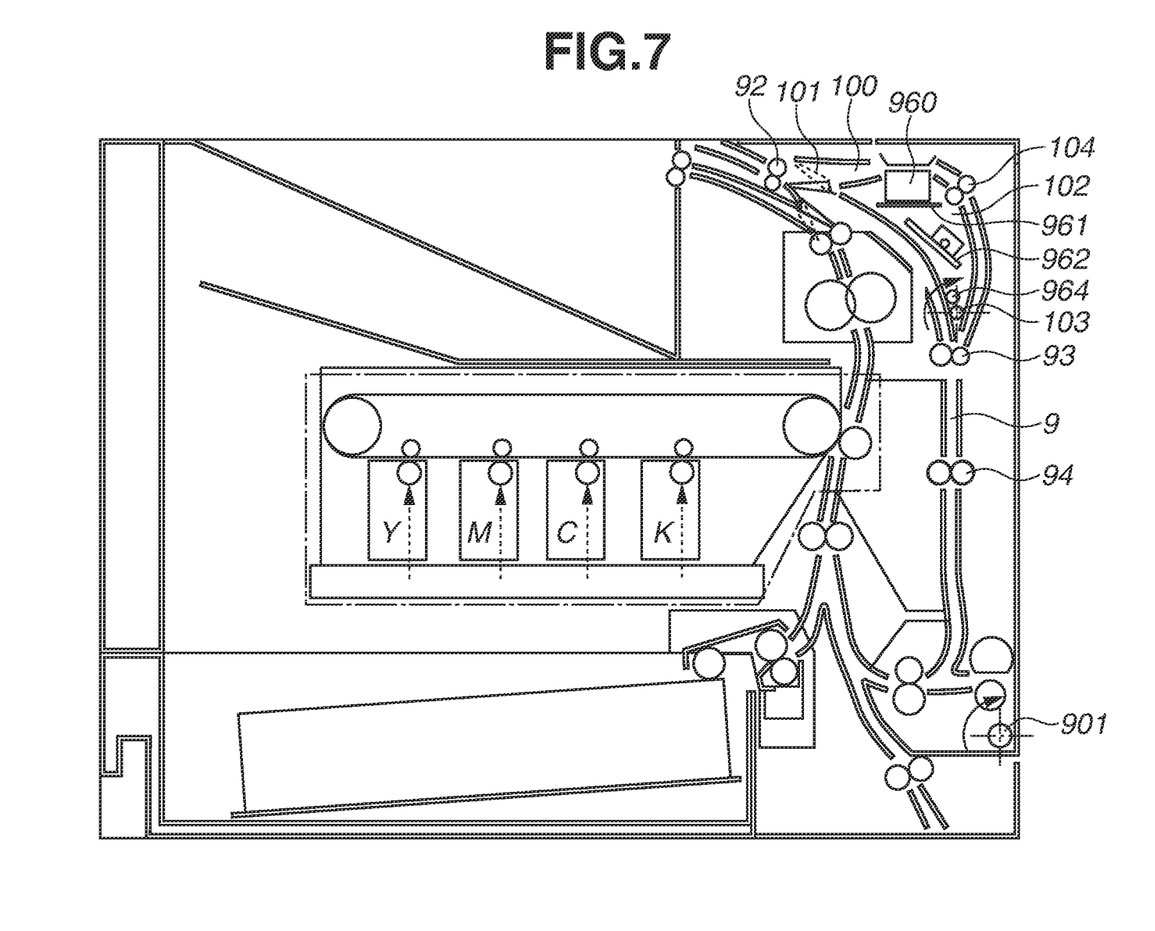
FIG. 7 is an overall diagram schematically illustrating an image forming apparatus according to a second exemplary embodiment.

In the second exemplary embodiment, as illustrated in FIG. 7, an image diagnosis conveyance path 100 is provided, and a CIS unit 960 as a reading unit is disposed at an intermediate position of the image diagnosis conveyance path 100. A rotatable reverse unit 102 includes the CIS unit 960 as the reading unit. The process from the feeding of a sheet S to the conveyance of the sheet S to a reverse roller 92 is similar to that of the first exemplary embodiment. Only if an image diagnosis is performed, an actuator (not illustrated) moves a switching flapper 101 to the position indicated by the solid line. As a result, the sheet S is guided into the image diagnosis conveyance path 100. A CIS 96 disposed at the intermediate position of the image diagnosis conveyance path 100 reads an image fixed on the sheet S to perform an image diagnosis. Subsequently, the sheet S is conveyed by a duplex conveyance roller pair 93 and passes through a duplex conveyance path 9. Accordingly, an image is formed on the other side of the sheet S through processes similar to those in the first exemplary embodiment, and the resultant sheet S is discharged onto a sheet discharge tray 82.

Figure 8:
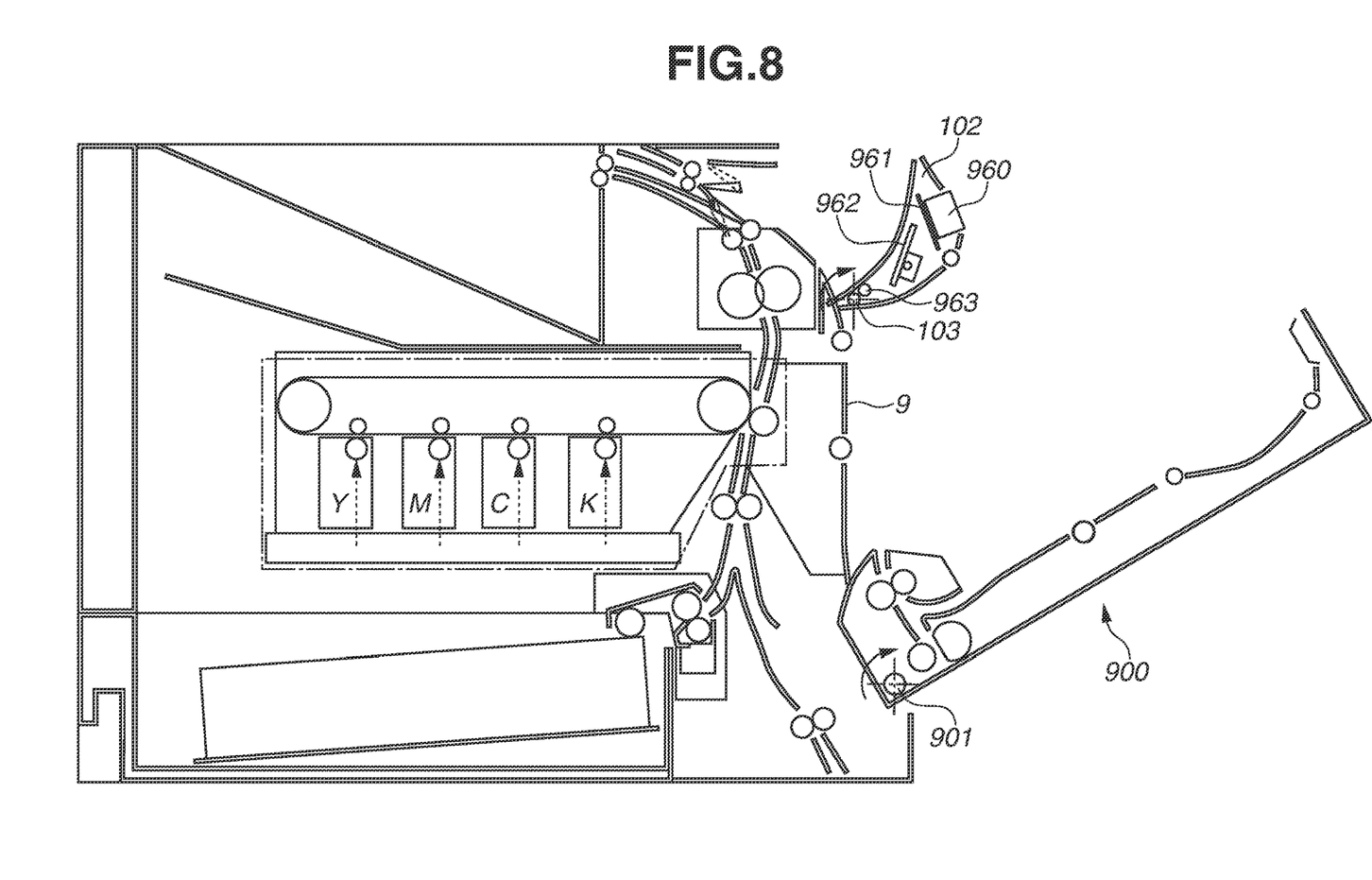
FIG. 8 is a sectional view illustrating a rotated duplex conveyance unit and a rotated reverse unit.

If an action is to be taken for an operational failure or a sheet jam that occurs downstream of the duplex conveyance path 9, or if the CIS 96 is to be cleaned, a duplex conveyance unit 900 is rotated about a duplex unit spindle 901 as illustrated in FIG. 8. As a result of the rotation, a user accesses the duplex conveyance path and takes various actions. If an action is to be taken for an operational failure or a sheet jam that occurs upstream of the duplex conveyance path, the reverse unit 102 is rotated about a reverse unit spindle 103, and the user takes various actions.

As similar to the first exemplary embodiment, a relay board 962 and a FFC 961 as a first signal transmission member connected to the CIS 96 are arranged in the reverse unit 102. The FFC 961 is connected to an HDMI cable 963 as a second signal transmission member via the relay board 962. The cable portion 963A of the HDMI cable 963 leads outwardly from the outside of the reverse unit 102 through the vicinity of the reverse unit spindle 103 in the coaxial direction with the reverse unit spindle 103. Such a configuration can prevent an electric signal wire from being broken even if the reverse unit 102 is rotated, as similar to the first exemplary embodiment.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-187036, filed Oct. 10, 2019, which is hereby incorporated by reference herein in its entirety.

What is claimed is:

1. An image forming apparatus comprising:
   an apparatus body having an image forming unit including an intermediate transfer belt and configured to form a toner image and to cause the intermediate transfer belt to bear the formed toner image;
   a transfer unit including a transfer member configured to secondarily transfer the toner image from the intermediate transfer belt to a sheet, wherein the transfer unit is configured to be rotatable about a first rotation shaft with respect to the apparatus body;
   a fixing unit configured to fix the toner image secondarily transferred to the sheet as an image on the sheet; and
   a duplex conveyance unit configured to convey the sheet having passed through the fixing unit toward the image forming unit again,
   wherein the transfer unit includes:
      a reading unit configured to read the image fixed on the sheet conveyed along a conveyance path in the duplex conveyance unit,
      a first signal transmission member that has a flat shape and that is connected to the reading unit,
      a relay member connected to the first signal transmission member and configured to relay a signal from the first signal transmission member, and
      a second signal transmission member having a round shape, wherein the second signal transmission member is connected to the relay member, and
   wherein the second signal transmission member leads into the apparatus body from an inner portion of the transfer unit in an axial direction of the first rotation shaft.

2. The image forming apparatus according to claim 1, wherein the transfer unit includes a support shaft that is supported by the apparatus body as the first rotation shaft, and
   wherein the second signal transmission member is disposed in the support shaft in the sight of the axial direction of the first rotation shaft.

3. The image forming apparatus according to claim 1, wherein the transfer unit includes a support shaft that is supported by the apparatus body as the first rotation shaft, and
   wherein the second signal transmission member is disposed near the support shaft in the sight of the axial direction of the first rotation shaft.

4. The image forming apparatus according to claim 3, wherein the transfer unit includes a groove portion into which the second signal transmission member is inserted.

5. The image forming apparatus according to claim 3, wherein the apparatus body includes a support member configured to support the support shaft,
   wherein the support member has a hole portion through which the second signal transmission member runs, and
   wherein the second signal transmission member moves in the hole portion as the transfer unit is rotated with respect to the apparatus body.

6. The image forming apparatus according to claim 1, wherein the first signal transmission member is an electric wire bundle including a plurality of electric wires bundled in a flat shape and is bendable in a planar direction.

7. The image forming apparatus according to claim 6, wherein the second signal transmission member includes an electric wire bundle in which a plurality of electric wires is bundled in a round shape.

8. The image forming apparatus according to claim 7, wherein the relay member is an electric board that couples the first signal transmission member to the second signal transmission member, and
   wherein the first signal transmission member and the second signal transmission member are electrically coupled via the electric board.

9. The image forming apparatus according to claim 8, wherein the transfer unit includes a guide on an opposite side of a side on which the transfer member is supported, and
   wherein, the guide forms a part of the conveyance path for a sheet to be conveyed by the duplex conveyance unit.

10. An image forming apparatus comprising:
    an apparatus body including an image forming unit configured to form an image on a sheet; and
    a rotation unit configured to rotate about a first rotation shaft with respect to the apparatus body,
    wherein the rotation unit includes:
       a reading unit configured to read the image on the sheet conveyed along a conveyance path;
       a first signal transmission member that has a flat shape and that is connected to the reading unit;
       a relay member connected to the first signal transmission member and configured to relay a signal from the first signal transmission member; and
       a second signal transmission member that has a round shape and that is connected to the relay member, and
    wherein the second signal transmission member leads into the apparatus body from an inner portion of the rotation unit in an axial direction of the first rotation shaft.

11. The image forming apparatus according to claim 10, wherein the rotation unit includes a support shaft that is supported by the apparatus body as the first rotation shaft, and
    wherein the second signal transmission member is disposed near the support shaft in the sight of the axial direction of the first rotation shaft.

12. The image forming apparatus according to claim 10, wherein the first signal transmission member is an electric wire bundle including a plurality of electric wires bundled in a flat shape and is bendable in a planar direction.

13. The image forming apparatus according to claim 12, wherein the second signal transmission member includes an electric wire bundle in which a plurality of electric wires is bundled in a round shape.

14. The image forming apparatus according to claim 13, wherein the relay member is an electric board that couples the first signal transmission member to the second signal transmission member, the first signal transmission member and the second signal transmission member being electrically coupled via the electric board.

\* \* \* \* \*